Oct. 15, 1946.   F. W. SCHWINN   2,409,395
BICYCLE CARRIER
Original Filed Nov. 19, 1943   2 Sheets—Sheet 1

Inventor
Frank W. Schwinn
By
Attys.

Oct. 15, 1946. F. W. SCHWINN 2,409,395
BICYCLE CARRIER
Original Filed Nov. 19, 1943   2 Sheets-Sheet 2
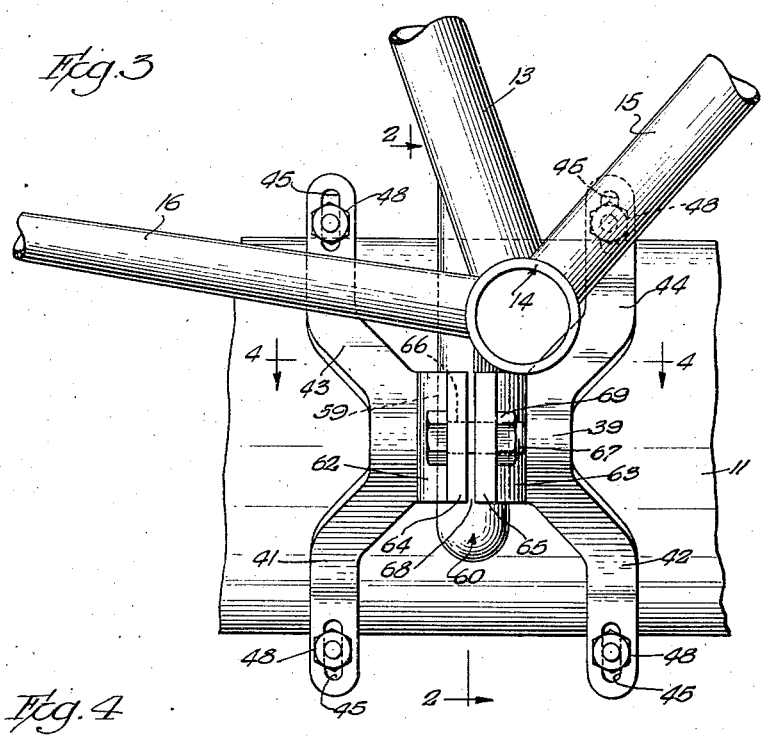
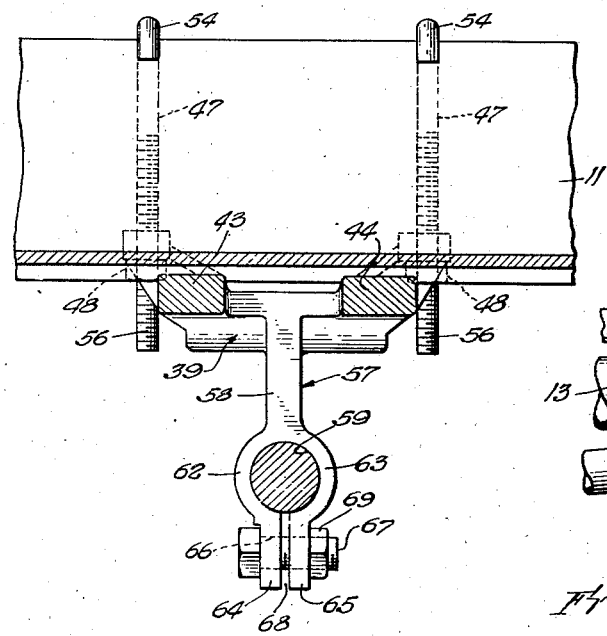
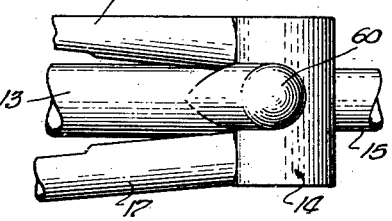
Inventor:
Frank W. Schwinn Patented Oct. 15, 1946

2,409,395

UNITED STATES PATENT OFFICE 2,409,395

BICYCLE CARRIER

Frank W. Schwinn, Chicago, Ill.

Original application November 19, 1943, Serial No. 510,875. Divided and this application March 7, 1945, Serial No. 581,393

9 Claims. (Cl. 224—29)

The present invention relates to bicycle carriers, and is particularly concerned with the provision of a carrier adapted to be used for transporting a bicycle on a motor car.

The present application is a division of my prior application, Serial No. 510,875, filed November 19, 1943, for Bicycle carrier, and relates particularly to the modified forms of the invention not covered by the patent which issued on said application as Patent No. 2,379,994, dated July 10, 1945. One of the objects of the invention is to provide an improved carrier and bicycle, the carrier of which is adapted to be secured to the front or rear bumper of an automotive vehicle in such manner that the bicycle may be supported by means of its frame for transportation with the vehicle in such condition that it may be removed at any time, ready for use.

Another object of the invention is the provision of an improved bicycle carrier for automotive vehicles, which is adapted to support the bicycle at such a point that there is little or no possibility of any damage to the bicycle by reason of the jolts and jars to which it may be subjected in transportation.

Another object of the invention is the provision of an improved bicycle carrier of the class described which is adapted to be mounted on bumper bars of varying width and varying thickness or bumper bars of various conformation or cross-section.

Another object of the invention is the provision of an improved bicycle carrier adapted to engage the frame and support the bicycle from its frame in such manner that no part of the bicycle touches any part of the motor car so that neither the bicycle nor the motor car will have its finish marred, nor will any part of either vehicle be damaged in any way.

Another object of the invention is the provision of an improved bicycle carrier which is simple, sturdy, and capable of being manufactured at a low cost, by means of which the bicycle may be quickly secured to the bumper for transportation or quickly released with a minimum amount of effort in condition for immediate use.

Another object of the invention is the provision of a modified construction which is adapted to be utilized with existing forms of bicycles by merely making a suitable modification of the bicycle frame.

Other objects and advantages of the invention will be apparent from the following description and the accompanying drawings, in which similar characters of reference indicate similar parts throughout the several views.

Referring to the drawings, of which there are two sheets,

Fig. 3 is a fragmentary sectional view, taken on the plane of the line 3—3 of Fig. 2, looking in the direction of the arrows;

Fig. 4 is a transverse cross-sectional view, taken on the plane of the line 4—4 of Fig. 3, looking in the direction of the arrows;

Fig. 5 is a fragmentary bottom plan view of the bicycle structure, shown apart from the carrier.

Figure 1:
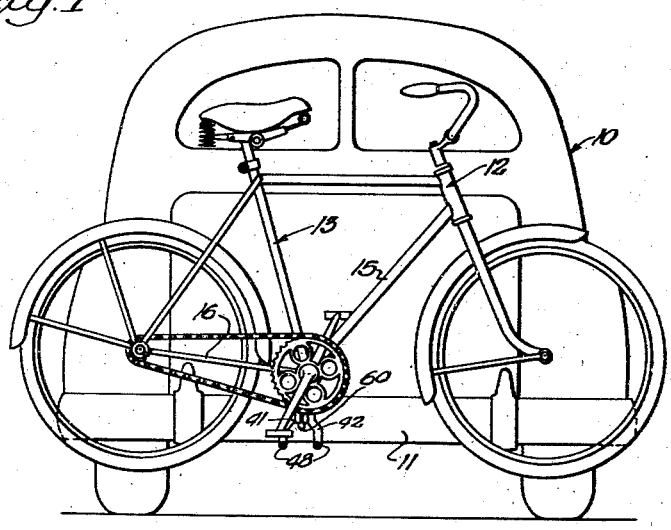
Fig. 1 is a rear elevational view of an automotive vehicle equipped with a bicycle carrier embodying the invention and shown in connection with a bicycle peculiarily adapted to be used with this carrier.

Referring to Fig. 1, 10 indicates in its entirety an automotive vehicle provided with a bumper 11 and with the present invention for supporting a bicycle 12. The present bicycle differs in the construction of its frame from the usual frame structure in the position and arrangement of the seat post mast tube 13.

In Fig. 3, 14 indicates the crank shaft hanger tube which is joined by welding or other secure fastening means to the down tube 15 with the axis of the down tube preferably intersecting the axis of the hanger tube. The rear fork members 16, 17 are also secured to the crank hanger tube in the usual manner, with the axis of each rear fork substantially intersecting the axis of the crank hanger tube.

The front down tube 15 is preferably located midway between the ends of the crank hanger tube, while the rear fork members are spaced from each other, as shown in Fig. 5, and their outer surfaces at the crank tube may be flush with the ends of the crank tube.

The seat post mast tube 13 and the hanger tube 14 preferably support a downwardly extending stud 60, which may be either solid or tubular, and which has a rounded lower end, and has its upper end suitably shaped to engage the seat post mast tube 13 and the hanger tube 14, to which the stud 60 is welded.

The stud 60 is adapted to be received in the bore 59 of a clamp carried by a supporting arm 58 of a carrier member 57. The clamping member 57 is provided with a pair of laterally curved arms 62, 63 surrounding the bore 59 and terminating in a pair of outwardly extending flanges 64, 65, separated by a slot 68.

The flanges 64, 65 are provided with the aligned apertures 66 for receiving the screw bolt 67, which is provided with a nut 69.

The size of the bore 59 is such that when the stud 60 is in the bore 59 and the flanges 64, 65 are drawn together by the bolt 67, the stud is firmly clamped in the bore 59. The bracket 57 is provided with a pair of downwardly extending arms 41, 42 and a pair of upwardly extending arms 43, 44. These arms spread laterally from a centrally located body portion 39 and are provided adjacent their ends with the slots 45 for receiving the hook bolts 47.

The slots 45 permit the hook bolts 47 to be located immediately above and below the bumper 11 and permit the device to be used upon bumpers of different width. Each hook bolt is formed with a hook 54 at one end and with a threaded portion 56 at the other end, to be engaged by the nut 48. The elongated threaded portion 56 permits the use of the hook bolts for securing the bracket upon bumpers of different horizontal thickness.

The body portion 39 of the bracket 57 is preferably provided with a V-shaped horizontal groove 49 and with a pad 53 of suitable resilient material, such as felt or rubber, to engage the bumper 11 without marring it. The V-shaped groove 49 permits the bracket to be used with bumpers of different curvature, and the flat end flanges 41—44 permit the bracket to be used as well upon flat bumpers.

Figure 2:
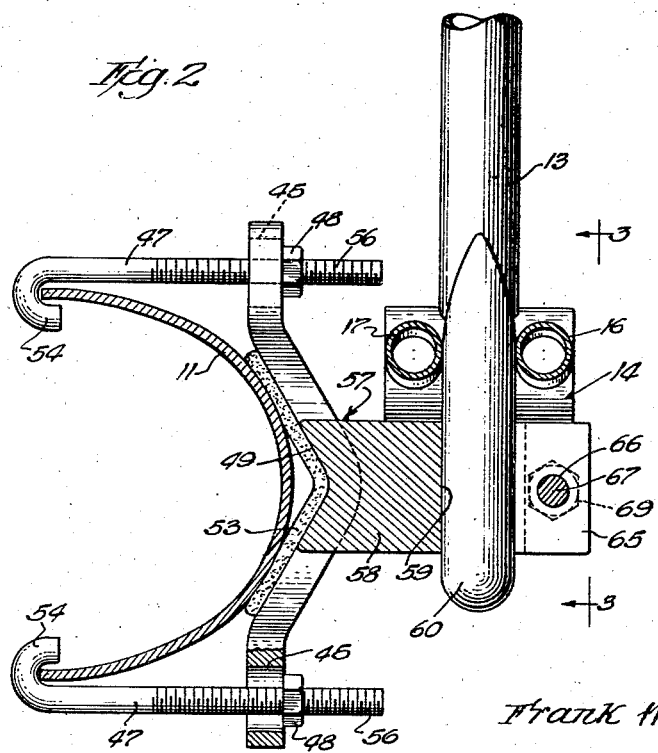
Fig. 2 is a fragmentary sectional view taken on the plane of the line 2—2 of Fig. 3, looking in the direction of the arrows.

The operation of the present bicycle carrier is substantially as follows: The clamp bolt 67 may be released until the clamp is separated from the stud 60 on the bicycle frame, and the clamping member 57 may then be secured to the bumper, as shown in Fig. 2. The position should be selected on the bumper which is adapted to hold the bicycle practically in center position with respect to the width of the vehicle; but some may prefer to move the bracket slowly toward the right so that the bicycle does not project at the left side of the vehicle, where cars going in the opposite direction might engage it.

The bracket 57 may be tightly secured on the bumper by means of the hook bolts 47. Then the bicycle may be mounted with its stud 60 in the bore 59, and the clamp bolt 67 may be tightened until the stud is firmly secured. When it is desired to use the bicycle, the user has only to release the clamp bolt 67 and to lift the bicycle off, and it is ready for immediate use.

In some bicycle constructions the steering post may be provided with a lock which will prevent the steering post from rotating during transportation. If desired, bicycles not equipped with such a lock may have a tension member, such as a spring, passed through between the spokes of the front wheel and drawn back until it can have both its ends hooked on the pedals or cranks to prevent the front wheel assembly from turning on the steering post.

The proximity of the bumper, however, which would otherwise engage the front tire, will prevent any substantial rotation of the front wheel assembly on its steering post.

It will thus be observed that I have invented an improved bicycle carrier by means of which the bicycle may be fixedly secured on the bumper of an automotive vehicle so that it is ready for immediate use, and it may be quickly attached or removed with a minimum of effort.

The present carrier supports the bicycle by means of its strongest part, that is, the frame, and it is located substantially in line with the center of gravity of the bicycle or as close to this position as can be attained while still making a firm attachment to the frame.

The present carrier is adapted to be used with bumpers of varying thickness and varying width, and holds the bicycle on the bumper of the motor car in such manner that it avoids marring or damaging of any part of either the motor car or bicycle. None of the parts of the bicycle need have their adjustment disturbed in mounting the bicycle on the car or dismounting it, and the bicycle is immediately ready to be ridden when the clamp which holds it has been released and the bicycle has been lifted off the bracket.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States is:

1. In a bicycle carrier the combination of a supporting bracket formed with a clamp socket, said bracket being adapted to be secured to the bumper of an automobile, and a bicycle having its frame provided with a downwardly extending stud adapted to be received in said clamp socket, said stud being permanently rigidly attached to said frame and a part thereof and holding the bicycle in upright position when said stud is clamped in said socket.

2. In a bicycle carrier the combination of a supporting bracket formed with a clamp socket, said bracket being adapted to be secured to the bumper of an automobile, and a bicycle having its frame provided with a downwardly extending stud adapted to be received in said clamp socket, said stud being shaped at its upper end to engage the crank shaft hanger tube of the frame to which it is welded and being shaped also to engage the outside of the seat post mast tube to which it is also welded.

3. In a bicycle carrier the combination of an automobile bumper having a convex outer surface with a bracket of substantially V shape having upwardly and downwardly extending slotted arms, said bracket being provided with a hook bolt in each of its arms adapted to hook over the edge of the bumper, said hook bolts having nuts for securing the bracket on the bumper, an outwardly projecting arm carried by the bracket and means carried by said arm for removably securing a bicycle frame to the arm at substantially the vertical axis passing through the center of gravity of the bicycle, said means comprising a clamp socket carried by said arm and a complementary stud permanently secured to the lower part of the bicycle frame on substantially the vertical axis passing through the center of gravity of the frame.

4. In a bicycle carrier, the combination of a bicycle frame having a seat post mast tube and a crank hanger tube, with a depending supporting stud fixedly secured to said seat post mast tube and hanger tube, and a supporting member comprising a body provided with a clamp for receiving said stud, said body having upwardly and downwardly extending arms for extending above and below a bumper, hook members hooking on the upper edge and the lower edge of said bumper and extending through said arms, and threaded means for drawing said hook members and body into close engagement with the bumper.

5. In a bicycle carrier, the combination of a bicycle frame having a seat post mast tube and a crank hanger tube, with a depending supporting stud fixedly secured to said seat post mast tube and hanger tube, and a supporting member comprising a body provided with a clamp for receiving said stud, said body having upwardly and downwardly extending arms for extending above and below a bumper, hook members hooking on the upper edge and the lower edge of said bumper and extending through said arms, and threaded means for drawing said hook members and body into close engagement with the bumper, said arms being provided with elongated slots, whereby the device may be applied to bumpers of different sizes.

6. In a bicycle carrier, the combination of a bicycle frame having a seat post mast tube and a crank hanger tube, with a depending supporting stud fixedly secured to said seat post mast tube and hanger tube, and a supporting member comprising a body provided with a clamp for receiving said stud, said body having upwardly and downwardly extending arms for extending above and below a bumper, hook members hooking on the upper edge and the lower edge of said bumper and extending through said arms, and threaded means for drawing said hook members and body into close engagement with the bumper, said body being provided with a transversely extending V-shaped groove for engaging an outwardly curved portion of the bumper.

7. In a bicycle carrier, the combination of a bicycle frame having a seat post mast tube and a crank hanger tube, with a depending supporting stud fixedly secured to said seat post mast tube and hanger tube, and a supporting member comprising a body provided with a clamp for receiving said stud, said body having upwardly and downwardly extending arms for extending above and below a bumper, hook members hooking on the upper edge and the lower edge of said bumper and extending through said arms, and threaded means for drawing said hook members and body into close engagement with the bumper, said body being provided with a transversely extending V-shaped groove for engaging an outwardly curved portion of the bumper, and said groove being provided with a resilient pad for engaging the face of the bumper.

8. In a bicycle carrier the combination of an automobile bumper, a bicycle frame having a downwardly extending stud permanently and rigidly affixed thereto, a V-shaped bracket having upwardly and downwardly extending arms, adjustable means cooperating with the bumper and said arms to hold said bracket on said bumper, an arm carried by said bracket and projecting away from the bumper, and a clamping socket carried by said arm for receiving and removably securing said stud so that said bicycle frame is supported and retained in upright position by said bracket.

9. In a bicycle carrier, the combination of a bracket having adjustable means for mounting it on an automobile bumper, a bicycle having a frame comprising a crank shaft hanger tube and a seat post mast tube and provided with a depending stud, said stud being permanently and rigidly fixed to both the crank shaft hanger tube and the seat post mast tube, and a socket carried by said bracket for receiving said stud to support said bicycle by said bracket in upright position on said bumper.

FRANK W. SCHWINN.